UNITED STATES PATENT OFFICE.

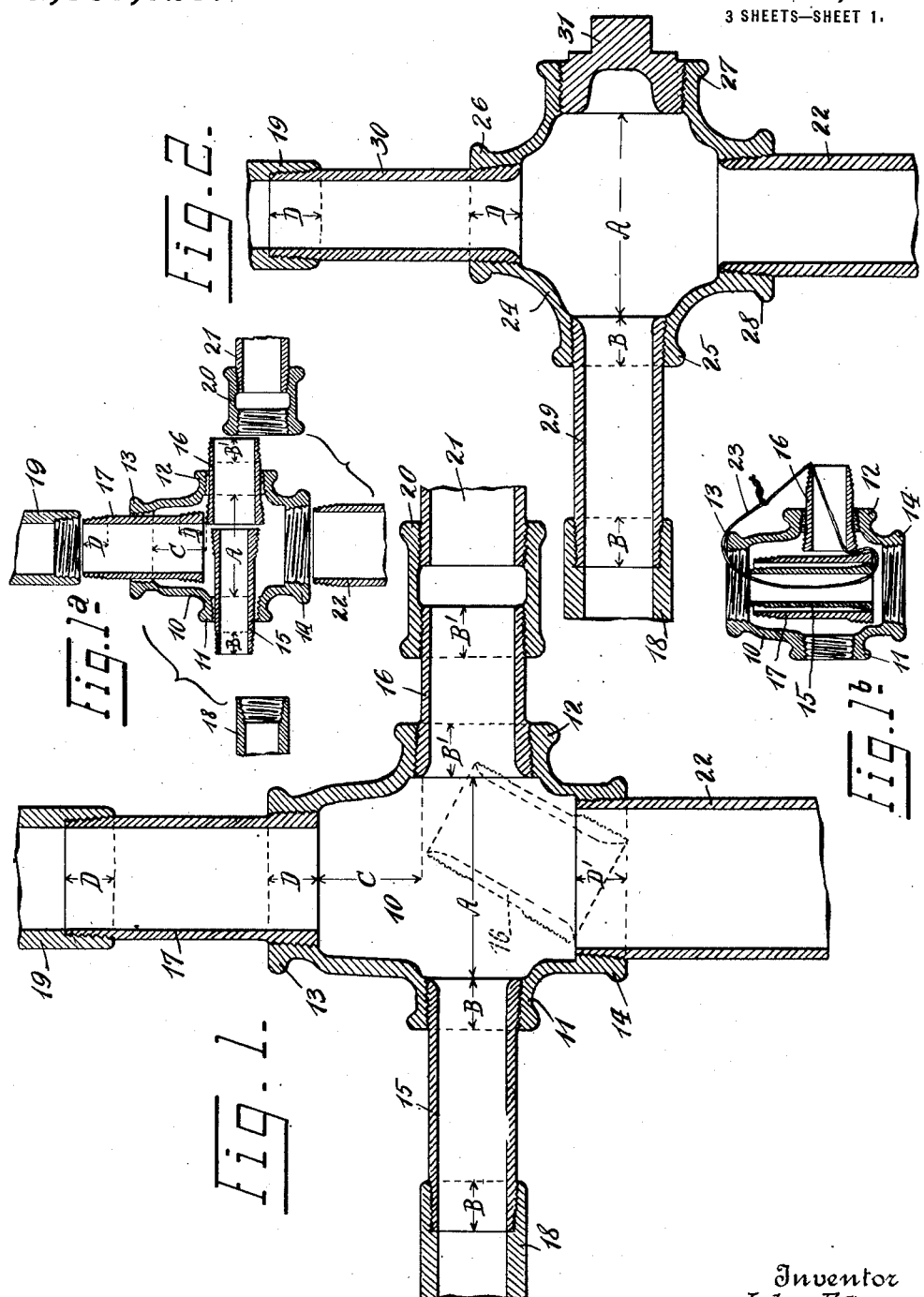

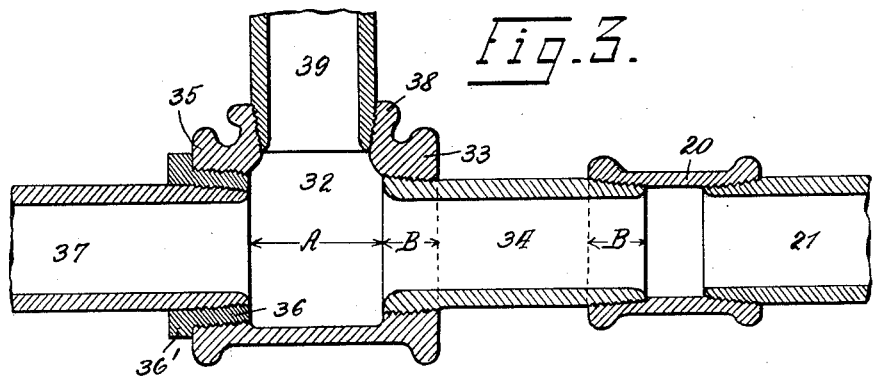
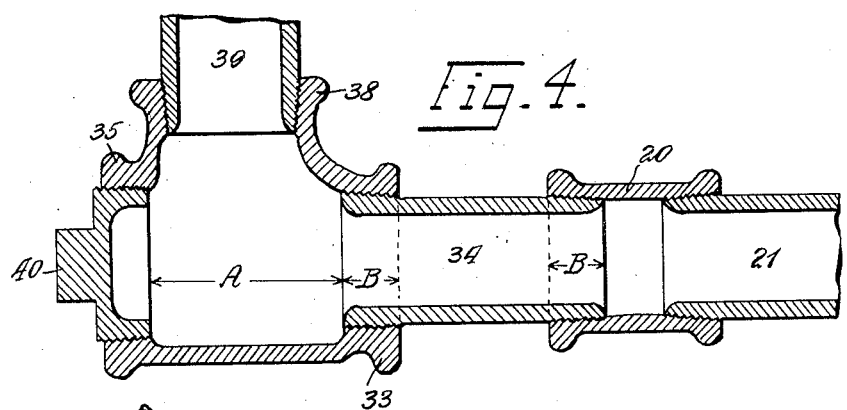
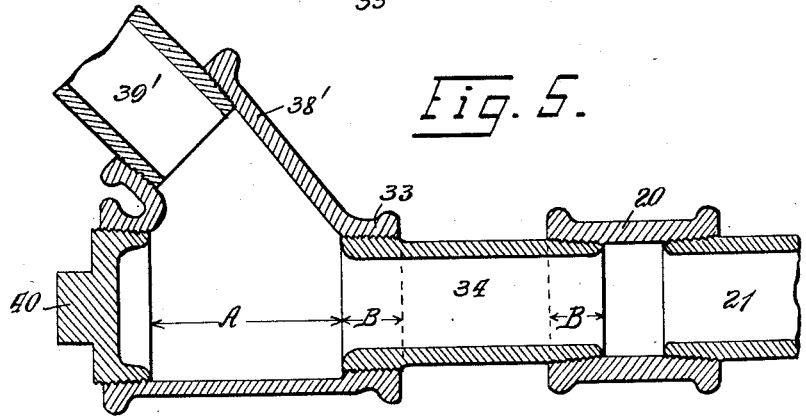

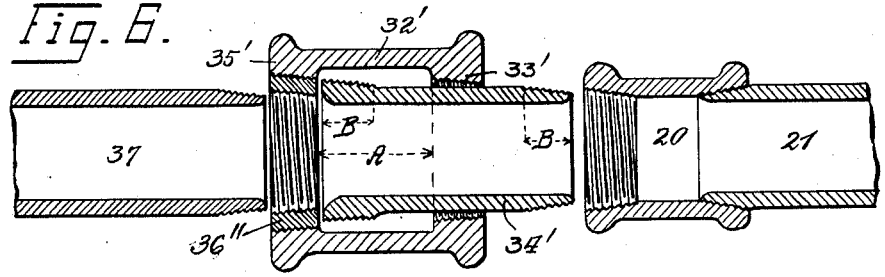
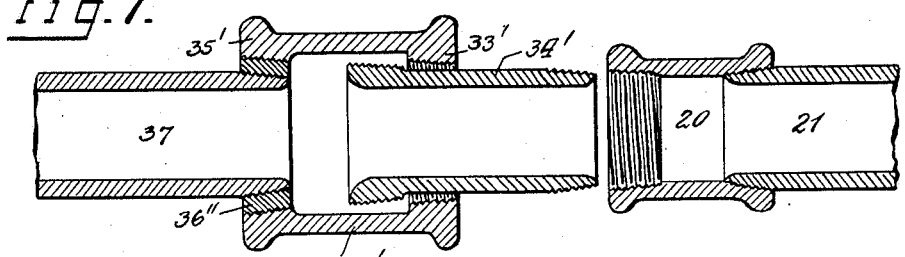
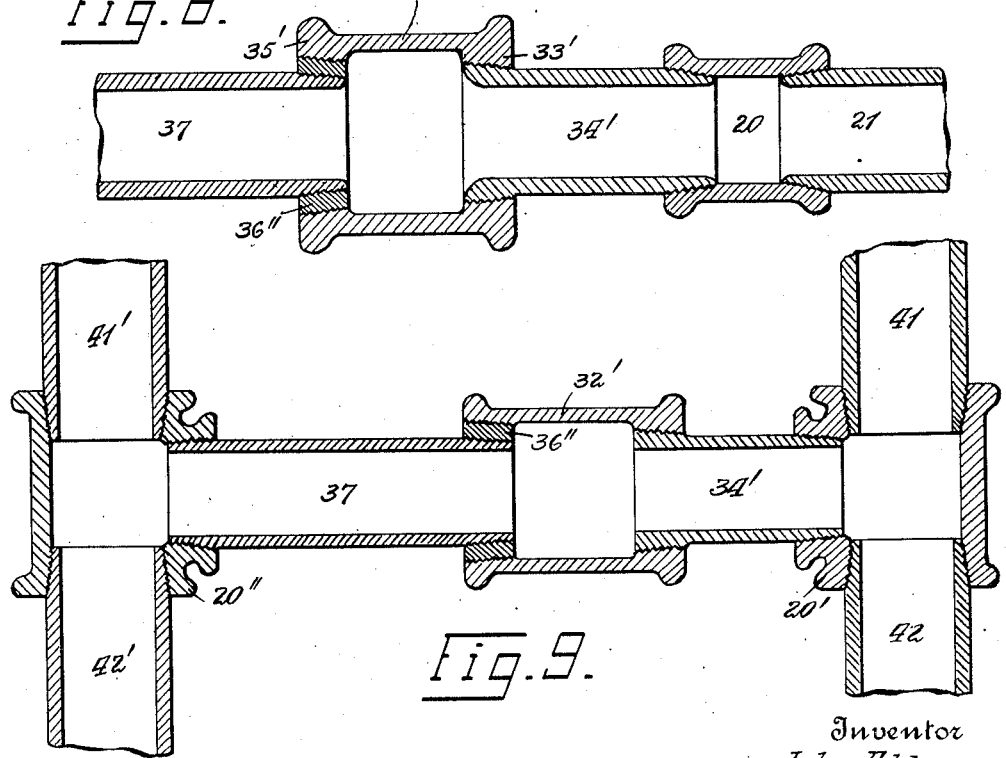

JOHN ELDER, OF NEW YORK, N. Y.

PIPE-COUPLING.

1,365,025.   Specification of Letters Patent.   Patented Jan. 11, 1921.

Application filed November 13, 1918. Serial No. 262,278.

*To all whom it may concern:*

Be it known that I, JOHN ELDER, a citizen of the United States, and resident of the borough of Brooklyn, county of Kings, city and State of New York, have invented certain new and useful Improvements in Pipe-Couplings, of which the following is a specification.

My invention has for its object to provide a system of pipe couplings of simple and efficient construction, for making connections for two, three, or more pipes or conduits, the device comprising but few parts, securing tight joints without requiring the use of washers even in the case of high fluid pressure, and being of special advantage on account of its adaptability for use in cramped positions, where but little space is available between the ends or pipes to be connected, particularly in cases where the springing or swinging of the parts to be connected is impossible or feasible only to a limited extent.

Without desiring to limit myself to the specific forms of my invention illustrated in the accompanying drawings, and with the understanding that my invention may be applied even to couplings having more than four connections, I will now proceed to explain in detail the use of my system in couplings for four, three, and two connections respectively.

In the said drawings, Figure 1 is a longitudinal section showing a four-connection pipe coupling embodying my invention; Fig. 1ª is a sectional view illustrating the manner of applying this coupling; Fig. 1ᵇ is a sectional view showing how the coupling represented in Figs. 1 and 1ª may be conveniently tied for packing and shipment; Fig. 2 is a view similar to Fig. 1 showing another form used as a three-connection coupling, although this same form may also be used as a four-connection coupling; Fig. 3 is a longitudinal section showing a three-connection coupling constructed according to my invention; Fig. 4 is a similar view of another form used as a two-connection coupling, although it may also be used as a three-connection coupling in the same manner as in Fig. 3; Fig. 5 shows a construction similar to Fig. 4, with the exception that one of the connections is at 45° to the other, instead of 90°; Figs. 6, 7, and 8, illustrate a two-connection coupling embodying my invention, showing said coupling at three successive stages of its application; and Fig. 9 is a longitudinal section illustrating an instance of a situation in which the coupling shown in Figs. 6, 7, and 8 may be employed advantageously.

In Fig. 1, the improved coupling consists of a body member 10 which is somewhat in the shape of a cross, having four interiorly-threaded connections or tubular projections 11, 12, 13, and 14 respectively, and three complementary members or nipples 15, 16, and 17 respectively, each provided at one end with an external screw-thread widening toward said end and adapted for connection with the internal screw-threads of the projections 11, 12, and 13 respectively, which threads are tapered outwardly from the central chamber of the member 10. The internal thread of the fourth connection, 14, is not tapered outwardly, but is preferably tapered inwardly, that is to say, toward the central chamber of the member 10. The free or outer ends of the nipples 15, 16, and 17 are preferably screw-threaded externally, for connection with the parts in conjunction with which the coupling is to be used; thus, the nipples 15 and 17 are shown in threaded connection with pipes 18 and 19 respectively, while the nipple 16 screws into a sleeve 20 which connects said nipple with a pipe 21. The inwardly-tapering internal thread of the connection 14 is shown in engagement with the correspondingly-tapered external thread on a pipe 22. Inasmuch as the nipples 15, 16, 17, are screwed outwardly from the central chamber of the body member 10 at the time of effecting their connection with the parts 18, 20, and 19 respectively, a special relation of dimensions is necessary in order to enable these nipples to be placed in position within the body member 10. In the particular instance illustrated, the width of the opening at the connection 12 is sufficiently greater than the largest external diameter of the nipple 15 to allow the latter to be inserted through said opening. Similarly, the opening of the connection 14 is of sufficient width to allow the nipple 17 to be inserted therethrough readily. When these two nipples have been introduced into the body member 10, the third nipple 16, the external diameter of which, at its widest portion, is also less than the width of the opening of the connection 14, is slipped in through said opening, as indicated by dotted lines in Fig. 1, and thus brought to its proper position, as also indicated in Fig. 1ª. It will be understood that no turning or screwing of the nipples is required to bring them to the position shown in Fig. 1ª, which may be termed the normal position of the coupling parts 10, 11, 12, 13, 14, 15, 16, 17 before the coupling is connected with the pipes or other stationary parts, such as 18, 19, 20, and 22. In the particular embodiment illustrated, the nipple 15 is the one smallest in diameter (at its inner end), the nipple 16 is of somewhat larger diameter, while the diameter of the nipple 17 is still larger, and the same relation obtains, of course, with reference to the diameters of the screw-threaded openings of the corresponding projections 11, 12, and 13 respectively, the opening of the projection 14 being even larger than that of the projection 13. The threads at the outer ends of the three nipples are preferably tapered in the same direction as those at the inner ends of the corresponding nipples, and in any event, for any one of the nipples, the thread at the inner end of a nipple should be of the same direction (right or left) and of the same pitch as the thread at the outer end of the same nipple, and also substantially or exactly of the same length. Thus, in Fig. 1, the length of the threaded portions at the ends of the nipple 15 is indicated at B, the length of the threaded portions at the ends of the nipple 16 is designated as B′, and the length of the threaded portions at the ends of the nipple 17, as D. While not essential to my invention, it is preferable, as shown, to have the length B equal to the length B′, and also to make the length D equal to the length D′ of the threaded portion of the opening in the projection 14, which is also, substantially, the length of the threaded portion on the pipe 22. The central chamber of the body member 10 is of a dimension related to the lengths B, B′, and D of the threads, as follows: The dimension of said chamber in the direction of the axis of the alining projections 11, 12, should be greater than the sum of the thread lengths of said projections; in other words, the dimension A should be greater than B+B′, or (when B=B′), greater than 2 B. Similarly, the dimension C, indicating the longitudinal play of the nipple 17, measured at right angles to A, should be greater than 2 D.

It will be understood that, in this form of my invention, the parts numbered from 10 to 17 inclusive, are those which would be put on the market as constituting the improved coupling. The other parts are not part of the invention, but would be found on the user's premises, or supplied by the person installing the new coupling. This person would first cut off the pipes 18, 19, 21, and 22 at the proper points, so that the distances between opposing pipe ends will correspond to those required by the completed condition of the coupling, as shown in Fig. 1. Having cut off these pipe ends, the person would thread them as indicated, apply the sleeve 20 as illustrated, and then the body member 10, with the three nipples retracted as shown in Fig. 1ª, would be inserted between the pipe ends 18, 19, 22, and the sleeve 20, and would then be screwed with its projection 14 on the threaded end of the pipe 22. In the particular embodiment illustrated, the inner end of the nipple 17 would be stopped or limited in its downward movement, by the inner ends of the other nipples, or by the wider one of them, 16. As the body 10 turns about the axis of the pipe end 22, the outer ends of the nipples 15 and 16 will, if retracted as shown in Fig. 1ª, clear the ends of the pipe 18 and of the sleeve 20 respectively. When proper connection has thus been made with pipe 22, the three nipples 15, 16, 17 are connected, in any order that may be convenient, although probably it will be desirable to connect one of the lateral nipples 15 or 16, or both, before effecting the connection of the nipple 17. Inasmuch as the operation of making the connection is exactly the same for each of the three nipples, it will suffice to describe how one of them is connected, say the nipple 15. This is first slipped lengthwise until the two threaded portions at the ends thereof come into engagement simultaneously, with the internal taper threads of the projection 11 and of the pipe 18 respectively. Then the nipple 15 is turned by means of a pipe wrench applied to its exposed portion, between the threaded ends, and thus a firm connection is effected at the same time, at both ends of said nipple.

For shipping purposes, the article consisting of the body 10 and of the three nipples 15, 16, 17 may be packed into a very small compass, the nipple 15 being nested within the nipple 17, and the nipple 16 projecting at one side, all the parts being held together say by a wire 23, see Fig. 1ᵇ.

It will be understood that the taper thread at the inner end of each nipple, which is adapted for connection with the body 10, is of somewhat larger diameter than the taper thread at the free or outer end of such nipple, so that the outer threaded end of the nipple may be slipped (without screwing) through the corresponding projection 11, 12, or 13 of the body 10.

In the construction illustrated by Fig. 2, the body 24 is cross-shaped, having four connections or tubular projections 25, 26, 27, 28, having internal taper threads, the threads of the projections 25 and 26 tapering outwardly to connect with corresponding external taper threads at the inner ends of nipples 29, 30 respectively, said nipples, at their free or outer ends, having external threads tapering in the same direction as the corresponding threads at the inner ends, but the diameter of the threaded portion at the outer end of each nipple is smaller than the diameter of the threaded portion at the inner end of the same nipple, for the same purpose as described above in connection with Fig. 1. The two nipples 29, 30 are shown as being alike, but I do not wish to restrict myself to this feature. The internal threads of the projections 27 and 28 taper inwardly, that is to say, toward the central chamber of the body 24, and as shown, the diameter of the thread at 27 is slightly larger than the diameter of the thread at 28, but this might be varied. The nipples 29, 30, and the projection 28 connect with the pipe ends 18, 19, and 22 in the same manner as described with reference to Fig. 1, so that the manner of effecting these connections in the case of Fig. 2 need not be explained in detail. The connection 27 is shown closed by a screw-plug 31, so that the coupling is illustrated as a three-connection coupling. It will be obvious however, that the same coupling might be used as a four-connection coupling, say by screwing a pipe connection into the projection 27, instead of the plug 31. In this form of my invention also, the longitudinal play of each nipple, within the central chamber of the body 24, would be at least equal to twice the length (B or D respectively) of the threaded nipple portions.

In Fig. 3, I have shown a three-connection coupling or T-coupling comprising a body 32 having an internally threaded projection or connection 33, the thread of which tapers outwardly, to match a corresponding taper thread at the inner end of the nipple 34, the outer end of which has an external taper thread of smaller diameter, but tapering in the same direction and of the same length as the thread at the inner portion of the nipple. At the opposite side, the body 32 has a tubular projection 35 screw-threaded internally with an inward taper, that is, toward the central chamber of the body 32, the opening of this projection being wide enough to allow the nipple 34 to be slipped therethrough, without screwing it. When the nipple has been thus inserted so that its wide inner end is within the central chamber of the body 32, a taper bushing 36 is screwed into the projection 35, and this bushing may have an angular (say, hexagon) head 36' for the application of a wrench. The only purpose of using a bushing is that, with the dimensions shown, the opening of the bushing being smaller than the wide end of the nipple, the nipple could not be introduced into the body 32 if the latter were made with an opening of the same diameter as that shown for the opening of the bushing. The latter has an internal screw-thread tapering toward the inside of the body 32, and adapted for connection with a pipe portion 37, in line with the pipe portion 21. At one side, the body 32 has a tubular projection 38, having an internal screw-thread tapering toward the inside of the body 32, and adapted to receive the correspondingly-threaded end of a pipe portion 39, extending at right angles to the pipe portions 21 and 37. It will be understood that in this case also, the play A allowed for longitudinal movement of the nipple 34, is more than twice the length B of the two threaded portions of said nipple, that is to say, A is greater than 2 B. After the pipe portion 37 has been connected with the coupling, the nipple 34 at that time being partly retracted into the central chamber of the body 32, so that the threads at the wide end of said nipple do not engage those of the projection 33, the nipple is moved outwardly, and as the pipes have been cut off and threaded to the proper length, the two threaded portions of the nipple will be brought into engagement simultaneously, with the threads on the tubular projection 33 and on the sleeve 20 respectively, and upon turning the nipple by means of a wrench applied to the smooth portion between the threads, the final coupled position illustrated in Fig. 3 will be attained.

Fig. 4 shows a coupling substantially of the same character as in Fig. 3, but used for two connections only, viz: with the pipe portions 21 and 39, the bushing 36 being omitted, and the third connection or tubular projection 35 being normally closed by a screw-plug 40.

Fig. 5 differs from Fig. 4 by having the lateral connection 38' arranged at an angle of 45° instead of 90° to connect with a pipe portion 39' threaded externally to fit the inwardly-tapering internal thread of said connection or projection 38'. While Fig. 5 shows a screw-plug 40 performing the same function as the like plug of Fig. 4, it will be obvious that instead of this plug I might provide a bushing such as at 36, 36' in Fig. 3, thereby obtaining a three-connection coupling in which the lateral connection would be at 45° to the axis of the other two connections.

In Figs. 6 to 9 I have shown a two-connection coupling embodying the same general features as explained above in connection with the other forms of my invention illustrated herein. The body 32' with its outwardly-tapering internally-threaded tubular connection 33' at one end, and the outwardly-tapering internally-threaded tubular connection 35', is practically the same as in Fig. 3, except for the omission of the third or lateral connection, and the connection 35' receives a bushing 36" similar to the one of Fig. 3, except that the projecting head (36') is not shown, although this feature might be used on the bushing 36", if desired. The nipple 34' is practically the same as the nipple 34. The internal thread of the bushing tapers inwardly and is adapted to connect with the correspondingly threaded end of the pipe portion 37, as before. The construction and manner of applying this coupling is the same in Fig. 9 as in Figs. 6, 7, and 8, but there is a slight difference in the connections shown at the right hand portion; in Figs. 6, 7, and 8, the nipple 34' connects, as before, with a sleeve 20 attached to the stationary pipe portion 21; in Fig. 9, the right-hand end of the nipple 34' screws into the lateral connection of a T-fitting 20', having three inwardly-tapering internal threads, the other two of which connect with stationary longitudinally-alining pipe portions 41, 42, while the corresponding end of the pipe portion 37 is fitted to a T-fitting 20" receiving similar alining pipe portions 41', 42'. These pipes 41, 42 and 41', 42' respectively constitute two parallel lines of pipe which are to be connected with the aid of my improved coupling, while in Figs. 6 to 8 the pipe portions 21 and 37 are to be thus connected. In either event, the stationary portions, that is to say, in the case of Figs. 6 to 8, the pipe portions 21 and 37, and, in the case of Fig. 9, the pipe portion 37, are cut to the proper length and properly threaded at their ends, and then the connection is effected as follows between the stationary pipe 37 and the likewise stationary sleeve 20 or T-fitting 20' respectively, it being understood that the pipe 37 has been secured in place at its left hand end, and that the sleeve 20 or fitting 20' is in position, so that there is a fixed distance between the free ends or openings of the pipe 37 and of the sleeve 20 or fitting 20' respectively: The nipple 34' is slipped back into the body 32' so that the total length of the coupling will be reduced; the nipple may be pushed back until its enlarger inner end touches the bushing 36", or almost so, as indicated in Fig. 6, where the total length of the telescoped coupling practically equals the length of the nipple, plus the thread length B. The body 32', or rather the bushing 36", is then screwed on the pipe portion 37, that is to say, the body 32' and bushing 36" move toward the left (compare Fig. 7 with Fig. 6) a distance equal to the length B of the nipple thread. The projecting or free end of the nipple (at the right hand) is then brought against the (left-hand) end of the part with which it is to be connected, that is to say, the sleeve 20 in the case of Figs. 6, 7, and 8, and the T-fitting 20' in the case of Fig. 9; at the same time that this free end of the nipple comes into proper relation to the thread of the sleeve 20 or of the T-fitting 20', the thread at the other end of the nipple comes into like relation to the thread of the tubular projection or connection 33' of the body 32'. Then, by applying a wrench to the nipple 34' to turn it (and preferably also holding the body 32' with another wrench to keep it from turning), both ends of the nipple are screwed at the same time and equally, into the corresponding threads of the sleeve 20 or of the T-fitting 20' and of the pipe 37 respectively, it being understood that these four threads are alike in direction, pitch, and taper. This screwing of the nipple will cause it to move toward the right, out of the central chamber of the body 32'. Inasmuch as the sleeve 20 or the T-fitting 20' is absolutely stationary during the turning of the nipple, it follows that the axial length of the chamber, or the longitudinal movement of the nipple, should be at least equal to the sum of the axial lengths of the two threads at the ends of the nipple, or when, as shown, the length is the same for each of these threads, said play should be at least equal to twice the length of the thread, or $A = 2B$, or preferably A should be somewhat greater than 2 B, as explained above. I prefer to make the thread at the outer or free end of the nipple shorter than the distance to which the nipple projects from the body 32' in the fully-collapsed position (Fig. 6), so that even in that position the smooth portion to which a wrench may be applied, will be partly exposed and readily engaged by such wrench; this particular feature however is not essential.

It will be noted that the taper thread on the enlarged, inner end of the nipple extends to that portion of said end which is of greatest diameter; by virtue of this construction the said enlarged end can be screwed in as far as required to obtain a tight fit, even beyond the position shown in Fig. 8, or Fig. 9.

The coupling can be readily inserted between stationary members, such as the pipe 37 and the sleeve 20 or T-fitting 20', which are quite close together, in fact, at a distance but slightly greater than the contracted or minimum length of the coupling when fully telescoped, as shown in Fig. 6. There is no need of forcing apart, or springing sidewise, the ends of the stationary parts with which the coupling coöperates. The coupling can therefore be placed readily between the parts to be connected, even when these parts are absolutely stationary and rigid so that they cannot be sprung apart or swung out of the way. Further, there is no need of inclining the coupling at the time of its insertion, but it can be slipped in straight, in alinement with the two parts to be connected. Neither is there any need of giving the parts of the coupling after they have been placed, any motion except the one of screwing them on the stationary parts with which they connect. In all these respects, my improved coupling is far superior to any device of the same class known to me.

It will be understood that the width of the central chamber of the coupling body is greater than the outside diameter of the inner end of the nipple, at its widest portion, so that the inner end of the nipple, when not screwed to said body, will be free to move or slide lengthwise in said chamber, in a direction parallel to the axis of the nipple.

For the sake of completeness, I will now describe in detail the preferred manner of applying my improved coupling in positions such as illustrated by Fig. 9. It will be understood that the line of pipe 41, 20' 42, and the other line of pipe 41', 20'' 42' are in position, and that the person doing the work has brought with him the improved coupling consisting of the unit formed by the parts 32', 34', and 36'', which cannot become separated, because the internal diameter of the bushing 36'' is smaller than the external diameter of the adjacent end of the nipple 34'. The plumber or other person also has a piece of pipe of proper diameter to form the pipe 37, but this pipe is not yet cut to proper length, and it is not threaded, or at least it is threaded at one end only. The first step consists in placing the parts 32', 34', and 36'', without the pipe 37, temporarily in the position shown in Fig. 9; a space or gap will thus be left between the adjacent ends of the T-fitting 20'' and of the body 32'. The person then measures the exact distance between these spaced ends, and also measures the distance between the opposite end of the body 32' and the adjacent end of the T-fitting 20'. This having been done, the nipple 34' is unscrewed from the T-fitting 20', and the unit consisting of the parts 32', 34', 36'' is removed from its position between the two parallel lines of pipe to a position where it may be handled readily for connection with the pipe 37. The threaded end of the pipe section 37 is screwed home pressure-tight and permanently into the bushing 36'' of said unit, so as to connect this pipe firmly with the body 32'. The projecting portion of said pipe is then cut to proper length, such length being made equal to the distance previously measured between the spaced ends of the body 32' and T-fitting 20'', plus the length of the threaded end portion required to connect the free end of said pipe 37 with the T-fitting 20''. The cut-off end of said pipe 37 is then threaded as required. It will be understood that this firm connection of the pipe 37 with the body 32' is effected while said body is disconnected from the two lines of pipe 41, 20', 42, and 41', 20'', 42'. Then the connected assembly of parts 37, 36'', 32', 34' (with the nipple 34' previously retracted into the body 32' fully, in the fashion indicated in Fig. 6), is placed between the T-fittings 20' 20'', it being evident that when the nipple 34' is thus fully retracted into the body 32', the total length of the assembly consisting of the parts 37, 36'', 32', and 34', will be less than the distance between the opposing ends of said T-fittings 20', 20''; the assembly of said parts can therefore be introduced readily between said fittings, without forcing or bending any of said parts. Thereupon a permanent pressure-tight connection is made with one of said fittings, say with the fitting 20'', by screwing the free end of the pipe 37 into said fitting, the screwing in of the pipe 37 being continued until the distance between the other fitting 20' and the end of the body 32' adjacent thereto, corresponds to the measurement previously taken between these elements at the time the coupling was placed in position temporarily as described above. There will thus be produced absolutely pressure-tight joints at both ends of the pipe 37. A check measurement may also be taken to determine whether the distance between the exposed end of the bushing 36'' and the adjacent end of the T-fitting 20'' corresponds to the measurement previously taken between these ends. The connection is then completed by screwing the nipple 34' tight at both ends simultaneously, where it fits into the body 32' and into the fitting 20' respectively. This final screwing in of the nipple 34' brings it from a position substantially like that in Fig. 7, to the final position Fig. 9, which is very similar to that in Fig. 8. The joints at both ends of the pipe 37 are pressure-tight, as stated above, and of course, the joints at both ends of the nipple 34' will also be pressure-tight, owing to the particular manner of assembling the parts, and owing to the fact that the threads at both ends of the nipple are alike in taper, pitch, and direction of the thread. In applying the invention, it is unnecessary to count the number of entered threads at either end of nipple 34', as any differences in tapping are compensated for at the time of the original trial insertion, and the final make-up will be practically identical with the temporary make-up.

Various modifications may be made without departing from the nature of my invention as set forth in the appended claims. The bushing 36, 36' or 36'' may be omitted if the pipe 37 or corresponding stationary part is of a diameter corresponding to the screw-thread of the tubular connection 35 or 35'.

I claim as my invention:

1. A high-pressure coupling for pipes and other articles, comprising a body having a central chamber and a tubular connection at one side thereof, said tubular connection having an internal screw-thread tapering outwardly and having a largest diameter which is smaller than the width of said chamber, and a nipple having at its inner end an enlargement tapered outwardly and screwthreaded on said taper to fit the thread of said tubular connection, the other end of said nipple having a threaded portion of like pitch, and direction of thread as said inner end, and the clearance provided in said chamber for the movement of the nipple lengthwise of its own axis, being at least equal to the combined length of said threaded portions of the nipple.

2. A high-pressure coupling for pipes and the like, comprising a tubular body and a nipple arranged for telescopic connection with said body, said body having two axially-alining spaced threads near its respective ends and a central chamber the diameter of which is greater than that of the thread on the side through which the nipple projects, the length or clearance for the sliding movement of the nipple in said chamber being at least equal to the aggregate length of the two threaded portions of said body, and the nipple having, near its ends, two spaced threads of like pitch and direction, one of which is an external thread extending to that portion of the corresponding end which is of greatest diameter, said thread being adapted to screw into one of the threads of said body, all of said threads tapering in the same direction lengthwise of the coupling.

3. A high-pressure coupling for pipes and other articles, comprising a tubular body and a nipple arranged for telescopic connection with said body, both provided with screw threads near their ends, the body having a central chamber of greater diameter than that screw-thread of the body which is adapted for connection with said nipple, the longitudinal play of the nipple in said chamber being in excess of the aggregate length of the two screw-threads of said body, and that threaded portion of the nipple which is adapted for connection with the body, being movable freely within said chamber when the threads of the nipple are out of engagement with those of the body, all four screw-threads being tapered in the same direction lengthwise of the coupling.

4. A pipe high-pressure coupling adapted to four-way connections, comprising a body having four tubular internally-threaded connections in cruciform shape, said connections being of different diameters, and a nipple adapted for longitudinal movement in said chamber, and having screw-threads at its ends, one of which is adapted to screw into said body.

5. A pipe high-pressure coupling adapted to four-way connections, comprising a body of crosslike shape having four tubular connections screw-threaded internally, said connections being of different diameters, and nipples adapted to screw into said tubular connections, two of said nipples being adapted to be nested one within the other.

6. A pipe high-pressure coupling adapted for three-way connections, comprising a body having two alining tubular connections and a lateral connection at an angle thereto, and a nipple having one end fitted within said body with longitudinal play, and screw-threaded to engage the screw-thread of one of said connections, the other end of said nipple having a screw-thread of like pitch and direction to connect with a stationary member, the said longitudinal play of said nipple in the body being in excess of the aggregate length of the two screw-threaded portions of the nipple.

7. A high-pressure coupling for pipes and other articles, comprising a body having an outwardly tapering threaded opening at one end, a stop-shoulder at the opposite end, said shoulder extending closer to the axis of the body than said taper-thread, and a central chamber between said thread and said stop-shoulder, and a telescoping nipple having similarly threaded inner and outer ends, said inner end having, within said central chamber, a longitudinal play in excess of the aggregate length of the two threaded ends of the nipple.

In testimony whereof, I have signed this specification.

JOHN ELDER.